Dec. 13, 1966 W. E. FOLKERTS 3,291,002
ROTARY VALVE WITH BYPASS
Filed July 21, 1964 3 Sheets-Sheet 1
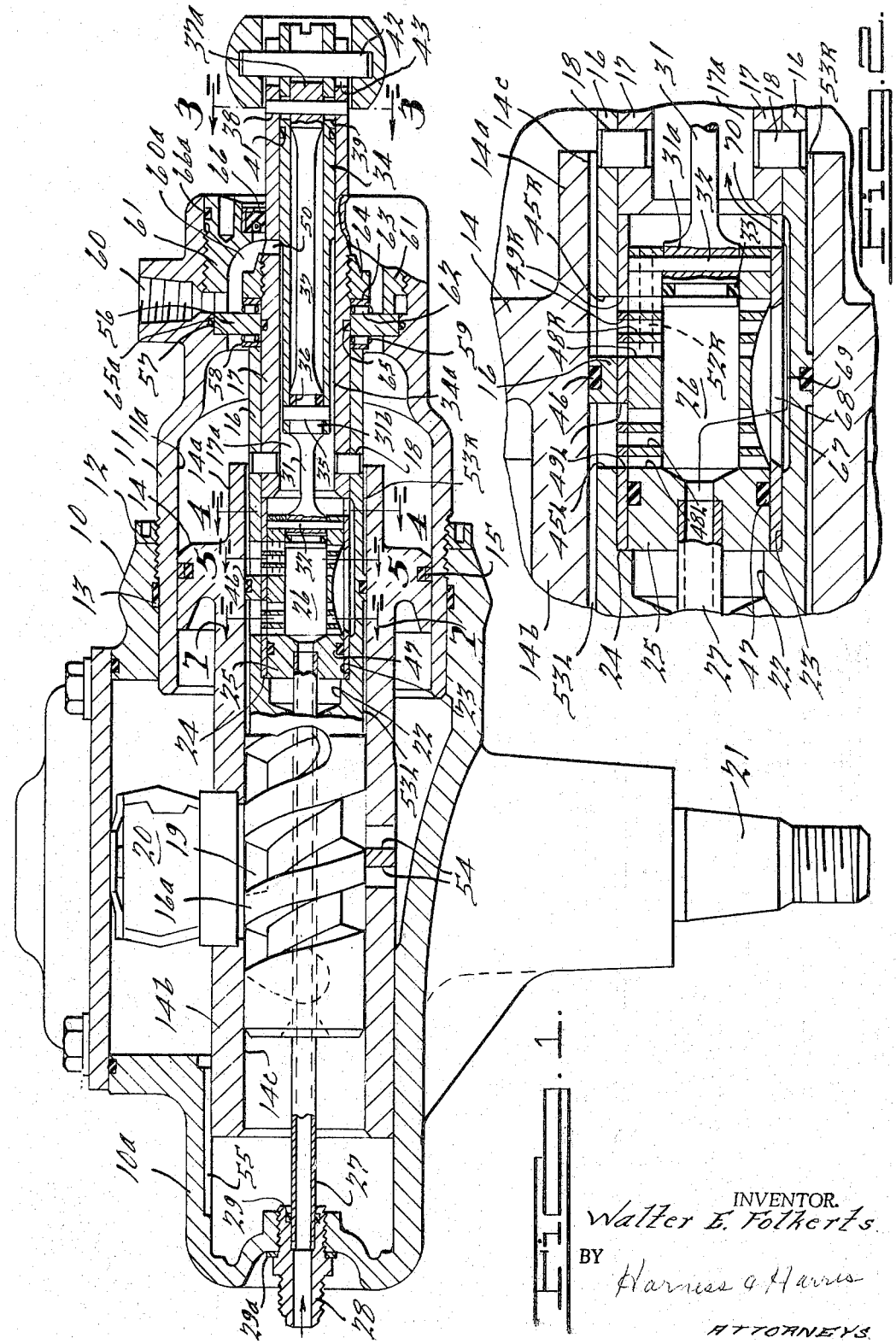
INVENTOR.
Walter E. Folkerts
BY
Harness & Harris
ATTORNEYS

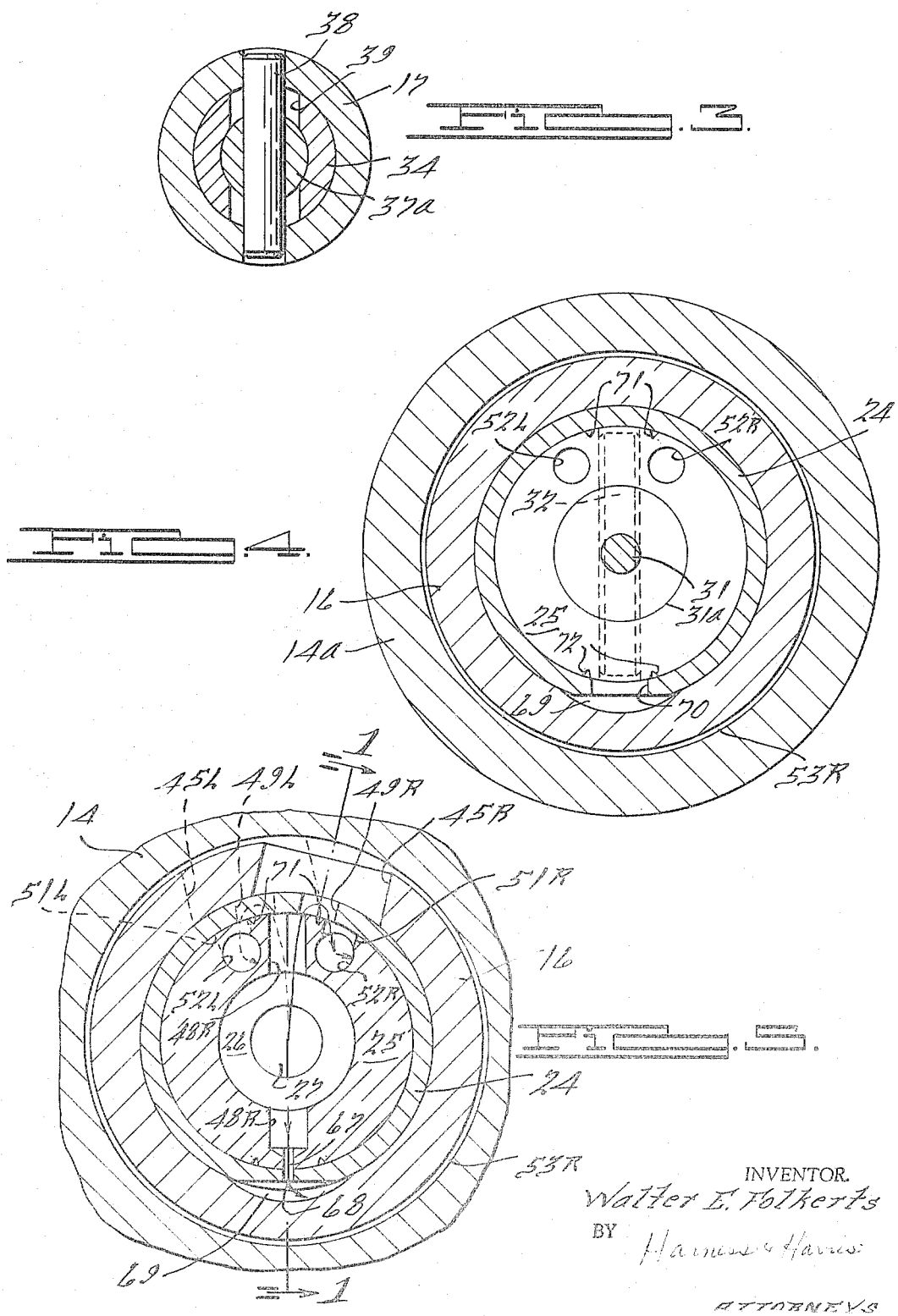

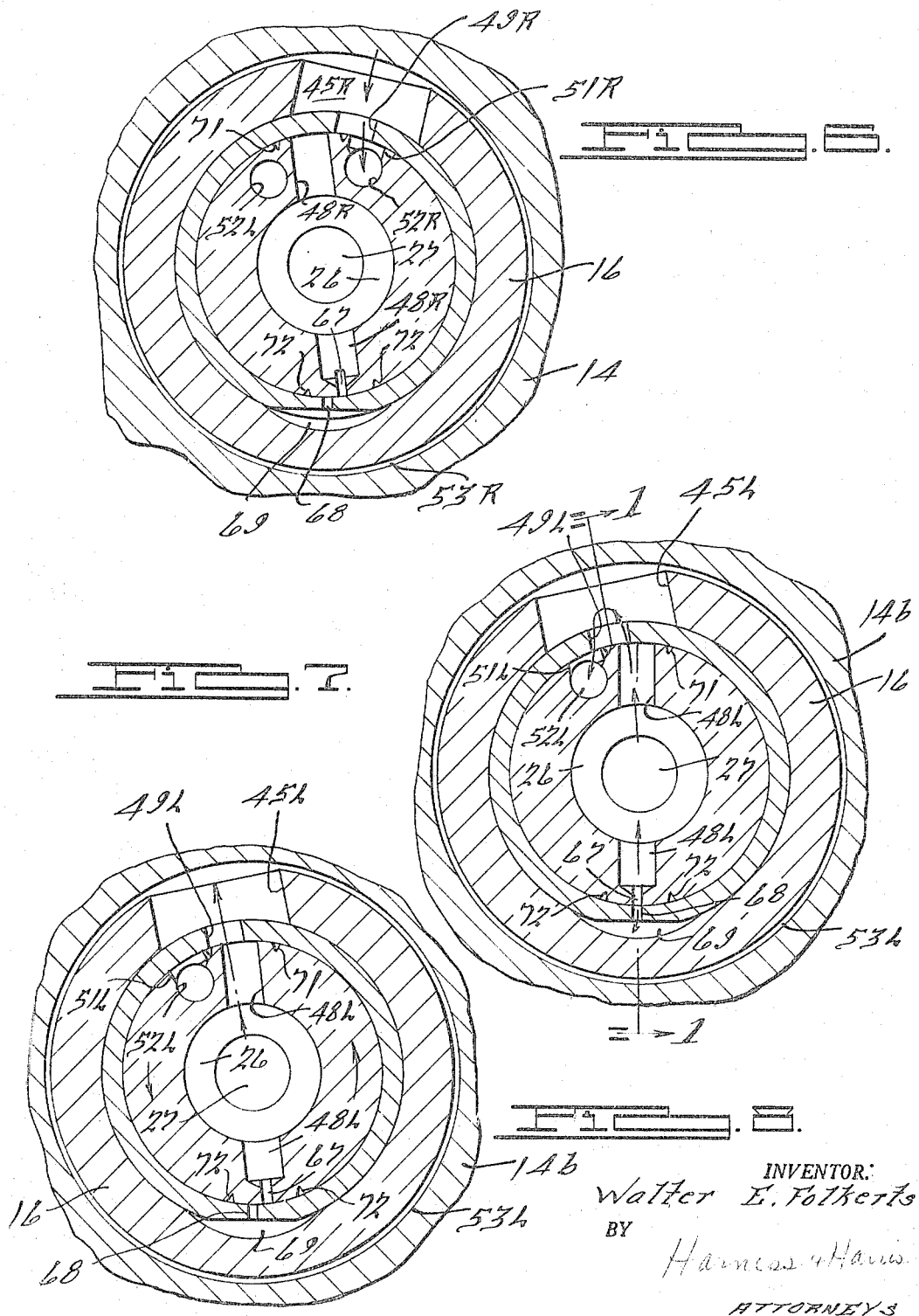

United States Patent Office 3,291,002
Patented Dec. 13, 1966

3,291,002
ROTARY VALVE WITH BYPASS
Walter E. Folkerts, Hazel Park, Mich., assignor to Chrysler Corporation, Highland Park, Mich., a corporation of Delaware
Filed July 21, 1964, Ser. No. 384,164
11 Claims. (Cl. 91—375)

This invention relates to improvements in a power steering gear particularly adapted for automotive use.

A serious problem of many years standing arising from the use of hydraulically actuated power steering gears, particularly with the heavier vehicles and high powered engines, has been overheating of the pressurized actuating fluid, which limits the choice of hydraulic fluid that can be used and deteriorates the seals and flexible hose connections employed with the steering gear. The high pressure fluid flowing through variable restricted orifices in the steering gear creates appreciable frictional heat, which when combined with unavoidable under-the-hood heat from the engine gives rise to the aforesaid overheating problem. The increasing power demands on the steering gear resulting from the wide tread, low pressure tires in common use make even higher hydraulic pressures desirable and increase the overheating problem.

In order to meet the problem of overheating, cooling devices for the hydraulic fluid have been suggested. These systems are costly, dissipate energy, and result in high fuel consumption. Hardened temperature resistant seals and hose couplings have been tried, but these likewise add to cost. More importantly, the hardened hose couplings between the high pressure fluid pump and the steering gear occasions objectionable noise.

An important object of the present invention is to provide improvements in a fluid actuated automotive power steering gear which is capable of operating appreciably cooler than conventional gears, which is characterized by less internal resistance to fluid pressure when the steering gear is in the neutral or straight-ahead steering position, and which accordingly requires less power for operation than comparable gears.

Another object is to provide such a gear which is particularly compact, efficient in operation, economical to manufacture, and characterized by fewer parts and external leak points than comparable gears.

Another object is to provide an improved steering gear and rotary valve therefore which is particularly responsive to manual steering movement to effect the desired power booster actuation, and which combines a simplified compact mechanism for sensing the road reaction to the steering movement.

Other objects of this invention will appear in the following description and appended claims, reference being had to the accompanying drawings forming a part of this specification wherein like reference characters designate corresponding parts in the several views.

FIGURE 1 is a cross sectional view of a steering gear embodying the present invention, taken generally along the axis of the driven shaft and worm gear and showing the rotary valve in the neutral position, the portions of the valve section through the right hand and left hand supply ports respectively being taken along the broken lines 1—1 of FIGURES 5 and 7 respectively.

FIGURE 2 is an enlarged longitudinal sectional view through the rotary valve, similar to FIGURE 1.

FIGURE 3 is an enlarged transverse sectional view taken in the direction of the arrows substantially along the line 3—3 of FIGURE 1.

FIGURE 4 is an enlarged transverse sectional view taken in the direction of the arrows substantially along the line 4—4 of FIGURE 1.

FIGURE 5 is an enlarged transverse sectional view taken in the direction of the arrows substantially along the line 5—5 of FIGURE 1.

FIGURE 6 is a view similar to FIGURE 5, showing the valve rotated to the left for a left turn.

FIGURE 7 is an enlarged transverse sectional view taken in the direction of the arrows substantially along the lines 7—7 of FIGURE 1.

FIGURE 8 is a view similar to FIGURE 7, showing the valve rotated to the left for a left hand turn.

It is to be understood that the invention is not limited in its application to the details of construction and arrangement of parts illustrated in the accompanying drawings, since the invention is capable of other embodiments and of being practiced or carried out in various ways. Also it is to be understood that the phraseology of terminology employed herein is for the purpose of description and not of limitation.

Referring to the drawings a particular embodiment of the present invention is illustrated by way of example in a hydraulically actuated steering gear for an automobile comprising a housing 10 having a separate extension 11 connected thereto by a screw threaded engagement and locked in position by a nut 12. A suitable seal 13 prevents leakage of fluid axially between the parts 10 and 11. The part 11 is provided with a cylindrical bore 11a in which a fluid pressure actuated piston 14 is reciprocable. An annular seal 15 around the periphery of the piston 14 cooperates with the latter to partition the bore 11a into left and right parts. The piston 14 is provided with tubular coaxial guide extensions 14a and 15b extending to the right and left respectively and cooperating to effect a bore 14c extending axially through the entire piston structure. The left extension 14b slides axially in guided relation within a cylindrical extension 10a of the housing 10.

A two part tubular driven shaft is rotatably supported within the bore 14c and comprises an outer shaft 16 and a coaxial inner shaft 17 snugly interfitting to complete a fluid tight seal therebetween and securely keyed together by a plurality of pins 18 for rotation as a unit. The left end of shaft 16 comprises an integral worm gear 16a which may have a variable or constant pitch and which is engaged by a rotatable tapered follower 19 adapted to ride along the grooves of the worm upon rotation of the latter. The follower 19 is journaled in a housing 20 secured to the extension 14b to reciprocate therewith. The follower 19 is operably connected with a rock shaft 21 to rotate the latter in one direction or the other upon axial reciprocation of the follower 19. The connection between the rock shaft 21 and follower 19 restrains the latter and the piston extension 14b against appreciable rotation upon rotation of the worm 16a. Thus rotational movement of the worm 16a is translated into substantial axial movement of the extension 14b and piston 14, and vice versa. The connection between the follower 19 and rock shaft 21 forms no part of the present invention and is accordingly not illustrated in further detail. Details of such a connection are illustrated more fully in my Patent Number 3,099,188.

Rightward of the worm 16a, the bore of the integral shaft 16 enlarges first at 22 and again at 23 to provide a seat for a coaxial snugly fitting outer cylindrical valve sleeve 24 which is confined against axial movement between the radial shoulder at the left end of the bore enlargement 23 and the left end of the inner shaft 17. The outer sleeve or valve member 24 is pressed tightly into the bore enlargement 23 to complete a fluid tight seal with the shaft 16 and to rotate as an integral unit therewith.

Rotatable coaxially within the outer sleeve or valve member 24 is a hollow inner cylindrical valve member 25 having an inner chamber 26 opening leftwardly to communicate with a source of pressurized fluid by means of a supply conduit 27 which extends axially through the worm 16a and into the left end of the inner valve member 25. The conduit 27 passes freely through the bore of the worm 16a so as to rotate independently thereof and is pressed snugly into the left end of valve member 25 to rotate as a unit therewith. The left end of conduit 27 extends rotatably into the left end of a tubular fitting 28 screwed into the housing extension 10a and adapted externally for connection with a source of pressurized fluid, as for example a power steering pump. Annular seals 29 and 29a around the conduit 27 and fitting 28 prevent axial endwise leakage of pressurized fluid from the housing extension 10a.

The right end of chamber 26 is closed by an enlarged cylindrical left end 31a of a flexible connector 31 which is connected to the inner valve member 25 for rotation as a unit therewith by means of a diametric pin 32. Annular seal 33 around the enlarged end 31a prevents axial leakage of pressurized fluid rightward from the chamber 26. A tubular driving shaft 34 co-axial with the connector 31 is connected at its inner end with the latter's enlarged cylindrical right end 31b by a diametric pin 35. By means of the pins 32 and 35 and connector 31, the inner valve member 25 is connected with the driving shaft 34 for rotation as a unit therewith. A suitable annular seal 36 around the enlargement 31b prevents axial leakage of hydraulic fluid from the bore 17a of the shaft 17 into the bore of the tubular driving shaft 34.

Also integral with the enlarged end 31b is a torsional rod 37 extending coaxially within the driving shaft 34 and terminating in an enlarged end 37a keyed to the outer driven shaft 17 by means of a pin 38. The latter extends through diametrically spaced and circumferentially extending lost motion slots 39 in the driving shaft 34, which allow at least approximately 8° of rotation of the driving shaft 34 in either direction from the neutral position, illustrated in FIGURE 1, before the driving shaft 34 engages the pin 38, FIGURE 3. A suitable annular seal 41 around the driving shaft 34 prevents axial end-wise leakage of hydraulic fluid from the bore 17a.

The driving shaft 34 is operably connected to the customary manually actuated steering wheel of the automobile by means of a steering shaft and universal coupling including the diametrical pin 42 as part thereof which extends through the right end of driving shaft 34 to rotate the latter. Similarly to the lost motion slots 39, diametrically spaced lost motion slots 43 are provided in the right end of driven shaft 17 for passage of the pin 42, so that upon rotation of the latter about the common axis of the shafts 17 and 34, the shaft 34 will rotate approximately 8° from the neutral position shown before the pin 42 engages the driven shaft 17. Thus the pin 42 comprises the main manual driving connection between the automobile steering wheel and driven shaft 17 in the event of hydraulic power failure.

In operation of the device described thus far, upon rotation of the manual steering wheel so as to rotate pin 42 and in turn rotate shaft 34 about its longitudinal axis, the rotation of shaft 34 will be imparted directly to the inner valve member 25 to rotate the latter and thereby to direct pressurized fluid either to the left or right side of piston 14 as described below so as to reciprocate the piston 14 and thereby rotate worm 16a and drive rock shaft 21 in the direction of the turn. Rotation of the driving shaft 34 will be resisted by the torsion of rod 37 connected at its right end to the driven shaft 17. This resistance will be determined by the road reaction on the dirigible wheels of the vehicle which resists turning of the rock shaft 21 and thereby resists rotation of gear 16 and shaft 17. In the event of hydraulic power failure, torsion rod 37 will either cause rotation of the driven shaft 17 directly if the road reaction is comparatively light, as for example during high speed driving, or the left end 31b of torsion rod 37 will rotate with driving shaft 34 approximately 8° with respect to the driven shaft 17, in which event pin 42 will engage driven shaft 17 to rotate the latter and worm 16a to effect manual steering.

In order to effect hydraulic power steering, the shaft 16 is provided with a pair of axially spaced work openings 45L and 45R at the region of the valve members 24 and 25 and spaced by an annular seal 46 between the circumference of shaft 16 and the inner bore 14c to cooperate with piston 14 in partitioning the cylinder 11a into the aforesaid left and right parts. Also an annular seal 47 is provided around the periphery of inner valve member 25 to engage the outer member 24 and prevent leakage of pressurized fluid from bore portion 22 into the valve porting system described below.

Communicating with the chamber 26 and extending radially through the circumferential sidewall of the valve member 25 at the regions of the work openings 45L and 45R respectively are two sets of axially spaced supply ports 48L and 48R, each set comprising three similar ports. Associated respectively with the three supply ports 48R are three work ports 49R extending radially through the outer valve member 24, FIGURES 2 and 5. Similarly associated respectively with the three supply ports 48L are three work ports 49L extending radially through the outer valve member 24, FIGURE 7. Associated respectively with the three work ports 49R and also with the three supply ports 48R are three return ports 51R extending radially into the outer surface of the inner valve member 25 at locations spaced circumferentially clockwise in FIGURE 5 from the associated supply ports 48R. Each of the ports 51R communicates with an axially extending return conduit 52R in the inner valve member 25. Similarly associated respectively with the three work ports 49L and also with the three supply ports 48L are three return ports 51L extending radially into the outer surface of the inner valve member 25 at locations spaced circumferentially counterclockwise from the associated supply ports 48L, FIGURE 7. Each of the return ports 51L communicates with a return conduit 52L extending in parallelism with the return conduit 52R within the body of the inner valve member 25.

The supply ports 48L and 48R are arranged in axial alignment so that a transverse sectional view through any one of these ports would be similar to the sectional view through any of the other of these ports. The three return ports 51R are arranged in axial alignment at the right of the three supply ports 48R respectively in FIGURE 5; the three return ports 51L are arranged in axial alignment at the left of the three supply ports 48L respectively in FIGURE 7; and when the valve is at the neutral position of FIGURE 1, the three work ports 49R are arranged in axial alignment at a circumferential location between the supply ports 48R and return ports 51R, and the three work ports 49L are arranged in axial alignment at a circumferential location between the supply ports 48L and return ports 51L. In other words, each of the work ports 49R is associated with one of each of the supply ports 48R and return ports 51R and is arranged between these associated ports when the valve is at a neutral position. Similarly each of the work ports 49L is associated with one of each of the supply ports 48L and return ports 51L and is arranged between these associated ports when the valve is at the neutral position.

Also when the valve members 24 and 25 are in the neutral position illustrated in FIGURES 1, 2, 5 and 7, each work port 49 (L or R) is in partial communication with both its associated supply port 48 (L or R) and return port 51 (L or R), so that pressurized fluid entering the chamber 26 from conduit 27 will be discharged through the supply ports 48L and 48R into the associated work ports 49L and 49R and thence into the associated return ports 51L and 51R to the return ducts 52L and 52R.

Rotation of the valve member 25 to the left as in FIGURE 6 will close the communication between the supply port 48L and work port 49R, and open the communication between the work port 49R and return port 51R. Thus pressurized fluid at the right side of the piston 14 will be returned as described below to the work opening 45R and discharged via return port 51R to return conduit 52R. During this same leftward rotation of valve 25, return port 51L will be rotated out of communication with work port 49L, and supply port 48L will be rotated into communication with work port 49L to supply pressurized fluid to work opening 45L and thence to the left side of piston 14 as described below.

It is apparent from the foregoing that upon rightward rotation of valve member 25 with respect to member 24 in FIGURES 5 and 7, the pressurized fluid will be supplied through ports 48R and 49R to opening 45R and thence to the right side of piston 14, whereas the return fluid will be discharged from the left side of piston 14 into work opening 45L and thence through ports 49L and 51L to return duct 52L.

The communication between work opening 45L and the left side of piston 14 is provided by the annular space 53L between tubular extension 14b and a reduced portion of shaft 16 extending leftward from adjacent seal 46 sufficiently to overlap the groove of the worm 16a. Thus pressurized fluid from work opening 45L will pass along the space 53L into the groove of worm 16a and thence through a plurality of ports 54 into housing 10 around the outer circumference of piston shaft 14b so as to assert pressure against the left side of piston 14 upon counterclockwise rotation of valve member 25, as in FIGURES 6 and 8. Fluid from within the main body of housing 10 is also conducted to the left end of extension 14b within housing portion 10a by means of conduit 55. The reverse flow path will return fluid from the left side of piston 14 to work opening 45L when valve member 25 is rotated clockwise with respect to valve member 24 in FIGURES 5 and 7. Fluid from work opening 45R is conducted axially to and from the right side of piston 14 via the annular space 53R between shaft 16 and piston extension 14a.

The return conduits 52L and 52R open axially endwise at the right end of the inner member 25 and communicate with the bore 17a of shaft 17, from which the return fluid flows axially within an annular space 34a between driving shaft 34 and driven shaft 17 to a plurality of radial ports 50 in the shaft 17. To this end, the outer diameter of shaft 34 is reduced from its left end to the region of the ports 50. The latter communicate radially outwardly of the shaft 17 with a chamber 60a in housing extension 11 and thence with a return connection 60 adapted to be connected with a reservoir or with the inlet side of the power steering pump.

The driven shaft assembly 16, 17 is held in axial position with respect to the housing 10, 11 by means of an annular stop or bearing race 56 abutting an annular shoulder 57 of the housing 11 and secured in position by a nut 61 screwed into the right end of housing 11 to close the latter. An annular needle bearing race 58 coaxially around shaft 17 abuts the right end of shaft 16 and is spaced from race 56 by a needle bearing set 59. A similar annular needle bearing set 62 around the shaft 17 spaces the race 56 from a second annular bearing race 63 maintained in axial position by a nut 64 screwed on the externally threaded right end of the shaft 17. Annular seals 65 and 65a around the inner and outer peripheries of the race 56 prevent axial endwise leakage of hydraulic fluid from the right side of cylinder 11a. The space 60a at the right of the ports 50 is closed by the nut 61 which carries annular seals 66 and 66a in sealing engagement with the outer periphery of shaft 17 and inner periphery of housing 11.

As described above, when the valve members 24 and 25 are in the straight ahead or neutral steering position, pressurized fluid from chamber 26 passes through supply ports 48L and 48R into the associated work ports 49L and 49R and thence through the associated return ports 51L and 51R to the drain ducts 52L and 52R. Without some provision to the contrary when the vehicle is operating at high speed, at the neutral position, the amount of overlap of ports 48L, 48R and return ports 51L, 51R by the work ports 49L, 49R must be appreciable in order to bypass the entire pump outlet without unduly restricting the flow of pressurized fluid and causing excessive overheating. In consequence, a comparative large steering movement would be required to overcome this overlap and connect opposite sides of the piston to pressure and drain.

In order to avoid the necessity of bypassing the entire pump outlet through the work ports 49L and 49R at the neutral position, a pair of associated narrow axially extending neutral slits or ports 67 and 68 are provided in the valve members 25 and 24 respectively diametrically opposite the supply ports 48L and 48R. The latter extend diametrically into the chamber 26 and continue into the opposite inner side wall of the member 25 so as to intersect the slit 67. At the neutral position, the slits 67 and 68 are coextensive as illustrated in FIGURES 2, 5, and 7. The slit 68 opens radially outwardly into an axially extending drain passage 69 formed in either or both of the juxtaposed portions of the outer valve member 24 and the shaft 16. The drain passage 69 is closed at its left in FIGURE 2. Its right end communicates by means of a notch 70 in the right edge of valve member 24 with the bore 17a of shaft 17 and thence with drain 60 as described above. In order to accommodate for leakage of fluid circumferentially around the inner valve member 25, a pair of axially extending drain grooves 71 in communication with bore 17a are provided in the outer surface of member 25 at opposite sides of the supply ports 48L and 48R. Similar drain grooves 72 are provided at opposite sides of the slit 67.

By virtue of the appreciable elongation of the slits 67 and 68, these may be very narrow and are cut for example by a thin circular saw blade. Accordingly upon slight relative rotational movement of the inner valve member 25, the slit 67 is rotated out of communication with slit 68, thereby to close the connection between chamber 26 and drain 60 which existed via slit 68 at the neutral position. The slits 67 and 68 are preferably dimensioned so as to bypass approximately 75% of the pressurized fluid flowing into chamber 26 when the valve members 25 and 24 are at the neutral position. The remaining 25% of the pressurized fluid is conducted to drain via the aforesaid communication established by the work ports 49L and 49R overlapping the associated supply ports 48L and 48R and return ports 51L, 51R. A slight overlap by the work ports 49L, 49R at the neutral position is preferred so that the slits 67 and 68 may be very narrow in their circumferential dimension to effect almost instant response of the pressure actuated piston 14 with a minimum of rotational movement of valve member 25 with respect to valve member 24. Thus a valve member having optimum sensitivity to steering movement of the manually operated steering wheel is achieved. At the same time power loss and resistance to fluid flow created by the valve 24, 25 at the neutral position is substantially eliminated. Frictional heating of the hydraulic actuating fluid is substantially reduced and an operating temperature reduction by as much as 50° F. on a hot day is accomplished.

What is claimed is:

1. In a valve, two relatively movable valve members, a work port in one of said members, supply and return ports in the other of said members, supply and return duct means in said other member and communicating with said supply and return ports respectively, means for connecting said supply duct means with a source of pressurized fluid, said work port spacing said supply and return ports when said members are at a neutral position with respect to each other and being movable into progressively greater communication with said supply or return port respectively upon relative movement of said members in one direction or the opposite from said neutral position, a separate neutral port in each of said members, said neutral ports in said members respectively being in communication with each other when said members are at said neutral position and being progressively movable out of communication with each other upon said relative movement of said members in said one direction or the opposite from said neutral position, the neutral port in said other member being in communication with said supply duct means, and means for connecting the neutral port in said one member and said return duct means with a drain.

2. In the combination according to claim 1, said work port being in partial communication with both said supply and return port when said members are at said neutral position and being progressively movable out of communication with said return or supply port upon progressive movement thereof into communication with said supply or return port, and said other member having portions adjacent said neutral port therein for progressively closing said neutral port in said one member upon said relative movement of said members in said one direction or the opposite from said neutral position.

3. In the combination according to claim 1, said neutral ports comprising narrow elongated slits extending transversely of said direction of relative movement and being dimensioned to pass the majority of the pressurized fluid flowing in said supply duct means when said members are at said neutral position.

4. In a valve, two relatively movable valve members, a work port in one of said members, supply and return ports in the other of said members, supply and return duct means in said other member and communicating with said supply and return ports respectively, means for connecting said supply duct means with a source of pressurized fluid, said work port spacing said supply and return ports when said members are at a neutral position with respect to each other and being movable into progressively greater communication with said supply or return port respectively upon relative movement of said members in one direction or the opposite from said neutral position, means for discharging pressurized fluid from said supply duct means when said members are at said neutral position comprising a first neutral port in said other member in communication with said supply duct means, and a second neutral port in said one member in communication with said first neutral port to discharge said pressurized fluid therefrom when said members are at said neutral position and being progressively movable out of communication with said first neutral port upon said relative movement of said members in said one direction or the opposite from said neutral position, said neutral ports comprising narrow elongated slits extending transversely of said directions of relative movement.

5. In a rotary valve, coaxial inner and outer cylindrical valve members rotatable with respect to each other about their common axis, a radially opening work port in the inner circumferential wall of said outer member, radially opening supply and return ports spaced circumferentially in the outer circumferential wall of said inner member, supply and return duct means in said inner member and communicating with said supply and return ports respectively, said supply duct means being adapted for connection with a source of pressurized fluid, said work port spacing said supply and return ports circumferentially when said members are at a neutral position with respect to each other and being arranged to rotate into progressively increasing communication with said supply or return port respectively upon relative rotation of said members in one direction or the opposite from said neutral position, a radially opening neutral port in the outer circumferential wall of said inner member and communicating with said supply duct means, a radially opening neutral port in the inner circumferential wall of said outer member, said neutral ports comprising axially extending slits arranged and dimensioned to communicate with each other and to pass a majority of the pressurized fluid flowing in said supply duct means when said members are at said neutral position and to rotate out of communication with each other when said members are rotated in said one direction or the opposite from said neutral position, the neutral port in said outer member and said return duct means being adapted for connection with a drain.

6. In a rotary valve, coaxial inner and outer cylindrical valve members rotatable with respect to each other about their common axis, a radially opening work port in the inner circumferential wall of said outer member, radially opening supply and return ports spaced circumferentially in the outer circumferential wall of said inner member, supply and return duct means in said inner member and communicating with said supply and return ports respectively, said supply duct means being adapted for connection with a source of pressurized fluid, said work port spacing said supply and return ports circumferentially and being in partial communication with each thereof when said members are at a neutral position with respect to each other and being arranged to rotate into progressively increasing communication with said supply or return port respectively upon relative rotation of said members in one direction or the opposite from said neutral position, a radially opening neutral port in the outer circumferential wall of said inner member and communicating with said supply duct means, a radially opening neutral port in the inner circumferential wall of said outer member, said neutral ports comprising axially extending slits arranged and dimensioned to communicate with each other and to pass a majority of the pressurized fluid flowing in said supply duct means when said members are at said neutral position and to rotate out of communication with each other when said members are rotated in said one direction or the opposite from said neutral position, the neutral port in said outer member and said return duct means being adapted for connection with a drain.

7. In a power steering gear, a housing having a cylindrical portion, a piston reciprocable in said cylindrical portion, a rotatable tubular driven shaft extending coaxially through said piston, means for interconnecting said piston and one end of said driven shaft to rotate the latter upon reciprocation of said piston, valve means carried by said shaft to rotate therewith, a cylindrical inner valve member rotatable coaxially within the bore of said shaft, said valve member having a chamber therein in communication with a source of pressurized fluid, rotatable driving means extending axially into the other end of said tubular shaft and coupled with said inner valve member to rotate the same relative to said shaft, a lost motion connection between said driving means and shaft for rotating the latter after predetermined rotation of said driving means, work conduit means in communication with opposite sides of said piston, drain conduit means, said work and drain conduit means being cooperable with said valve means and valve member for selectively interconnecting said cylindrical portion of said housing at one side or the opposite of said piston with said chamber and for simultaneously interconnecting said cylindrical portion at said opposite or one side of said piston with said drain conduit means, said driving means including a tube coaxial with said tubular driven shaft, means within said other end of said tubular driven shaft connecting said valve member with an inner end of said tube for rotation together as a unit, a torsion rod extending coaxially within said tube and having an inner end secured to said inner end of said tube for rotation as a unit therewith, and means integrally connecting the outer end of said torsion rod with said driven shaft for rotation as a unit therewith.

8. In a power steering gear, a housing having a cylindrical portion, a piston reciprocal in said cylindrical portion, a rotatable tubular driven shaft extending coaxially through said piston, means for interconnecting said piston and one end of said driven shaft to rotate the latter upon reciprocation of said piston, valve means carried by said shaft to rotate therewith, a cylindrical inner valve member rotatable coaxially within the bore of said shaft, said valve member having a chamber therein in communication with a source of pressurized fluid, rotatable driving means extending axially into the other end of said tubular shaft and coupled with said inner valve member to rotate the same relative to said shaft, a lost motion connection between said driving means and shaft for rotating the latter after predetermined rotation of said driving means, work conduit means in communication with opposite sides of said piston, drain conduit means, said work and drain conduit means being cooperable with said valve means and valve member for selectively interconnecting said cylindrical portion of said housing at one side or the opposite of said piston with said chamber and for simultaneously interconnecting said cylindrical portion at said opposite or one side of said piston with said drain conduit means, a tubular extension extending coaxially into said other end of said tubular driven shaft, means connecting said driven shaft and extension for rotation as a unit, said driving means including a tube extending coaxially into said extension and also including means connecting the inner end of said tube and valve member for rotation as a unit, a torsion rod extending coaxially within said tube and having an inner end connected to said inner end of said tube for rotation as a unit therewith, and means connecting the outer end of said torsion rod with said tubular extension for rotation as a unit therewith.

9. In the combination according to claim 8, thrust bearing means arranged coaxially around said extension and abutting said other end of said driven shaft, means on said extension clamping said thrust bearing means snugly into abutment with said other end, and means on said housing engageable with a radial extension of said thrust bearing means to hold the latter in fixed axial relationship with respect to said housing.

10. In a power steering gear, a housing having a cylindrical portion, a piston reciprocable in said cylindrical portion, a rotatable tubular driven shaft extending coaxially through said piston, means for connecting one end of said tubular shaft with a source of pressurized fluid, means interconnecting said piston and driven shaft to rotate the latter upon reciprocation of said piston, a tubular outer valve member secured coaxially within said tubular driven shaft to rotate as a unit therewith, an inner cylindrical valve member rotatable coaxially within said outer member, said inner valve member having a chamber therein open at one axial end into the bore of said driven shaft to receive pressurized fluid therefrom and closed at its other axial end, a pair of separate work ports associated with opposite sides of said piston respectively and extending radially into the circumferential wall of said outer member, separate work conduit means communicating each work port with its associated side of said piston to supply pressurized fluid thereto to actuate said piston, return duct means extending axially in said inner member and opening axially into a portion of said tubular driven shaft in the axial direction toward the latter's other end opposite said one end, exhaust means for connecting said portion of said tubular driven shaft with a drain, separate supply and return ports associated with each work port, said supply and return ports opening radially in the outer circumferential wall of said inner member and extending therein to communicate with said chamber and return duct means respectively, the supply and return ports associated with each work port being spaced circumferentially by that work port when said members are at a neutral position of rotation with respect to each other, one work port being arranged with respect to its associated supply and return ports to rotate into progressively increasing communication with its associated supply or return port respectively upon relative rotation of said inner member in one direction or the opposite from said neutral position, the other work port being arranged with respect to its associated supply and return ports to rotate into progressively increasing communication with its associated return or supply port respectively upon said relative rotation of said inner member in said one direction or the opposite from said neutral position, a radially opening neutral port in the outer circumferential wall of said inner member and communicating with said chamber, a radially opening neutral port in the inner circumferential wall of said outer member, means connecting the latter neutral port with said portion of said tubular driven shaft, said neutral ports comprising axially extending slits arranged and dimensioned to communicate with each other and to pass the greater part of the pressurized fluid flowing into said chamber when said members are at said neutral position and to rotate rapidly out of communication with each other upon said relative rotation of said inner member from said neutral position.

11. In a power steering gear, a housing having a cylindrical portion, a piston reciprocable in said cylindrical portion, a rotatable tubular driven shaft extending coaxially through said piston, means for connecting one end of said tubular shaft with a source of pressurized fluid, means interconnecting said piston and driven shaft to rotate the latter upon reciprocation of said piston, valve means carried by said shaft to rotate therewith, a cylindrical inner valve member rotatable coaxially within the bore of said shaft, said valve member having a chamber therein opening at one axial end into the bore of said tubular shaft to receive pressurized fluid therefrom and being closed at its other axial end, rotatable driving means extending axially into the other end of said tubular shaft and coupled with said inner valve member to rotate the same relative to said shaft, a lost motion connection between said driving means and shaft for rotating the latter after predetermined rotation of said driving means, work conduit means in communication with opposite sides of said piston, drain conduit means, said work and drain conduit means being cooperable with said valve means and valve member for selectively interconnecting said cylindrical portion of said housing at one side or the opposite of said piston with said chamber and for simultaneously interconnecting said cylindrical portion at said opposite or one side of said piston with said drain conduit means, said driving means including a tube coaxial with said tubular driven shaft, means within said other end of said tubular driven shaft connecting said valve member with an inner end of said tube for rotation together as a unit, a torsion rod extending coaxially within said tube and having an inner end secured to said inner end of said tube for rotation as a unit therewith, and means integrally connecting the outer end of said torsion rod with said driven shaft for rotation as a unit therewith.

References Cited by the Examiner

UNITED STATES PATENTS

| | | | |
|---|---|---|---|
| 1,947,991 | 2/1934 | Jessup | 91—375 |
| 2,138,050 | 11/1938 | Vickers | 91—375 |
| 2,938,399 | 5/1960 | Briggs | 91—375 |
| 3,138,069 | 6/1964 | Bishop | 91—375 |
| 3,162,263 | 12/1964 | Brown | 91—375 |

MARTIN P. SCHWADRON, *Primary Examiner.*

PAUL E. MASLOUSKY, *Examiner.*